United States Patent [19]
Matousek et al.

[11] Patent Number: 5,489,239
[45] Date of Patent: Feb. 6, 1996

[54] ROTARY COMBINE

[75] Inventors: Robert A. Matousek, Milan; James L. Shivers, Viola, both of Ill.

[73] Assignee: Case Corporation, Racine, Wis.

[21] Appl. No.: 306,635

[22] Filed: Sep. 15, 1994

[51] Int. Cl.⁶ .................................................. A01F 12/28
[52] U.S. Cl. ............................................ 460/62; 460/109
[58] Field of Search .................................. 460/107, 108, 460/109, 62, 82, 83

[56]  References Cited

U.S. PATENT DOCUMENTS

| | | | |
|---|---|---|---|
| 3,470,881 | 10/1969 | Knapp et al. | 130/27 |
| 3,631,862 | 1/1972 | Rowland-Hill | 460/109 |
| 3,871,384 | 3/1975 | Depauw et al. | 460/109 |
| 4,330,000 | 5/1982 | Peiler | 130/27 L |
| 4,375,221 | 3/1983 | Bernhardt et al. | 130/27 S |
| 4,425,925 | 1/1984 | Kersting et al. | 460/62 |
| 4,802,496 | 2/1989 | Bennett | 460/109 |
| 4,805,643 | 2/1989 | Tetaka | 460/109 X |
| 5,041,059 | 8/1991 | Ricketts | 460/101 |
| 5,395,287 | 3/1995 | Coers | 460/109 X |

*Primary Examiner*—Terry Lee Melius
*Attorney, Agent, or Firm*—Rudnick & Wolfe

[57] ABSTRACT

A rotary combine including an elongated rotor assembly having a rotor mounted within a rotor casing for threshing crop materials passing through the rotor assembly. The rotor casing includes an axially elongated threshing section defined by a plurality of concaves that define an arcuate section extending axially along a underside of the rotor casing. Each concave extends in partial circumferential relation relative to the rotor and is supported for movement toward and away from the rotor. An improved concave adjustment mechanism including a powered motor assembly is operably disposed between the frame of the combine and each of the concaves so as to permit on-the-go adjustment of the concaves in unison relative to the rotor to variably control the cooperative threshing relationship between the rotor and the concaves.

22 Claims, 7 Drawing Sheets

ROTARY COMBINE

FIELD OF THE INVENTION

The present invention generally relates to rotary combines having an open-ended casing including an axially elongated threshing section defined by a plurality of concaves that cooperate with a rotor mounted in the casing for threshing and separating crop materials as they pass through the combine and, more particularly, to a powered adjustment assembly for effecting powered movement of the concaves toward and away from the rotor to variably control the cooperative threshing relationship between the rotor and concaves.

BACKGROUND OF THE INVENTION

Agricultural combines are well known in the art. They are available in various designs and models to perform the basic functions of harvesting and threshing of crop materials. A typical combine includes a crop harvesting apparatus which reaps planted grain stalks. An infeed mechanism arranged at the forward end of the combine operates in combination with the harvesting apparatus and feeds the grain stalks to a separating apparatus. The separating apparatus acts on the crop materials to thresh and separate grain from material other than grain.

A typical rotary combine has a separating apparatus that includes an axially elongated foraminous casing or cage that surrounds a rotor. Between the upstream and downstream ends of the separating apparatus, the crop materials are threshed several times repeatedly, but gently, as it spirals around the single large diameter rotor and passes through the threshing cage. Suitable instrumentalities on the rotor cooperate with an axially elongated threshing section on the lower portion of the casing to thresh the crop materials such that most of the grain will be separated and propelled downwardly through the threshing section. The threshing section of the casing or cage is comprised, at least in part, by a series of side-by-side perforated concaves. Each concave extends in partial circumferential relation relative to the rotor and defines an arcuate section in the lower region of the casing. Each of the concaves are supported for movement toward and away from the rotor.

The spacing between the rotor and concaves must be adjusted for different crops and different conditions. Various forms of concave adjusting devices for setting the clearance between the concave and rotor are known in the art. One form of concave adjusting device involves the use of shims to modify the clearance between the concaves and the rotor. Another form of adjusting device is shown in U.S. Pat. No. 3,871,384 to R. A. Depauw et al. Both of these known concave adjusting mechanisms involve time consuming manual processes for adjusting the clearance between the concaves and the rotor.

During operation of the combine, there are occasions when the continual flow of crop material through the rotor assembly becomes hindered or even blocked. To return the rotor assembly to working order, the operator must move the concaves away from the rotor to the fullest extent possible to provide adequate clearance for the problematic blockage to move through the rotor assembly. Thereafter, the concaves need to be returned to their operative position relative to the rotor assembly to continue the combine operation.

As will be appreciated, each of the concaves defining the threshing section of the rotor assembly is of substantial weight. Moreover, the threshing area of a combine has relatively tight space constraints therewithin. Thus, manual adjustment of the concaves relative to the rotor can be a time-consuming and tedious process. Of course, while the concaves are being adjusted relative to the rotor, the combine is ineffective. During a crop harvesting operation, time is a premium concern and, therefore, downtime for the combine should be minimized.

Thus, there is a need and a desire for a combine adjusting mechanism that promotes quick and easy adjustment of the concaves relative to the rotor.

SUMMARY OF THE INVENTION

In view of the above, and in accordance with the present invention, there is provided an improved concave adjustment mechanism for a rotary combine. The improved concave adjustment mechanism includes a powered motor assembly that is operably associated with the rotor assembly of the combine. The rotor assembly of the combine includes a rotor arranged within a rotor casing for threshing crop materials directed through the rotor assembly. The rotor casing includes an axially elongated threshing section defined by a plurality of side-by-side concaves. Each concave defines an arcuate section in the lower region of the casing. Each concave is supported within a housing of the combine for movement toward and away from the rotor.

The powered motor assembly of the concave adjusting mechanism is operably disposed between the combine frame and the concaves. In that embodiment of a combine wherein more than one concave is arranged in combination with the rotor, the powered motor assembly preferably moves all the concaves in unison relative to the rotor.

In a preferred embodiment, the powered motor assembly comprises a linkage assembly extending from the concaves. The linkage assembly is connected to a screw drive mechanism that is rotatably driven by a motor. The screw drive mechanism preferably includes a crosshead threadably mounted on a screw that turns about a fixed axis. The crosshead is connected to the linkage and linearly moves in response to actuation of the motor. The motor and screw of the screw drive mechanism are preferably interconnected through a force transfer mechanism such as a gear set. In a most preferred form of the invention, the screw of the screw drive mechanism extends beyond the housing of the combine and is configured to allow a tool to be secured thereto for effecting manual adjustment of the concaves relative to the rotor when required.

In a preferred form of the invention, the motor of the powered motor assembly is bidirectional such that it effects powered movement of the concaves both toward and away from the rotor. In a most preferred fond of the invention, the motor is electrically driven. A switch is mounted in the cab region of the combine such that, when desired, the concaves may be adjusted on-the-go. Moreover, arranging the switch within the confines of the cab allows the operator to remain comfortably seated while allowing adjustment of the concaves relative to the rotor.

The concave adjustment mechanism preferably further includes an indicator that is movable with the concave for visually indicating the position of the concave relative to the rotor. In addition, the concave adjustment mechanism can include a sensor for monitoring the position of the concave relative to the rotor and a visual display, preferably arranged in the cab region of the combine and connected to the sensor, for indicating the position of the concave relative to the rotor.

The concave adjustment mechanism promotes quick and easy adjustment of the concaves relative to the rotor thereby minimizing downtime for the combine and, thus, enhancing combine performance. When in an operational position, the concave is adjusted such that a medial portion of each concave is arranged closer to the rotor than are opposite ends of the respective concaves. In a preferred embodiment, merely actuating the powered motor assembly allows the concaves to be moved away from the rotor the full travel of the concaves and subsequently repositioned relative to the rotor in a minimal period of time. If necessary, manual adjustment of the concaves can be effected. Moreover, various indicators are provided by the concave adjustment mechanism for indicating the position of the concave relative to the rotor.

Numerous other objects, aims and advantages of the present invention will become readily apparent from the following detailed description, the appended claims, and the detailed drawings;

DETAILED DESCRIPTION OF THE DRAWINGS

DETAILED DESCRIPTION OF A PREFERRED EMBODIMENT

Figure 1:
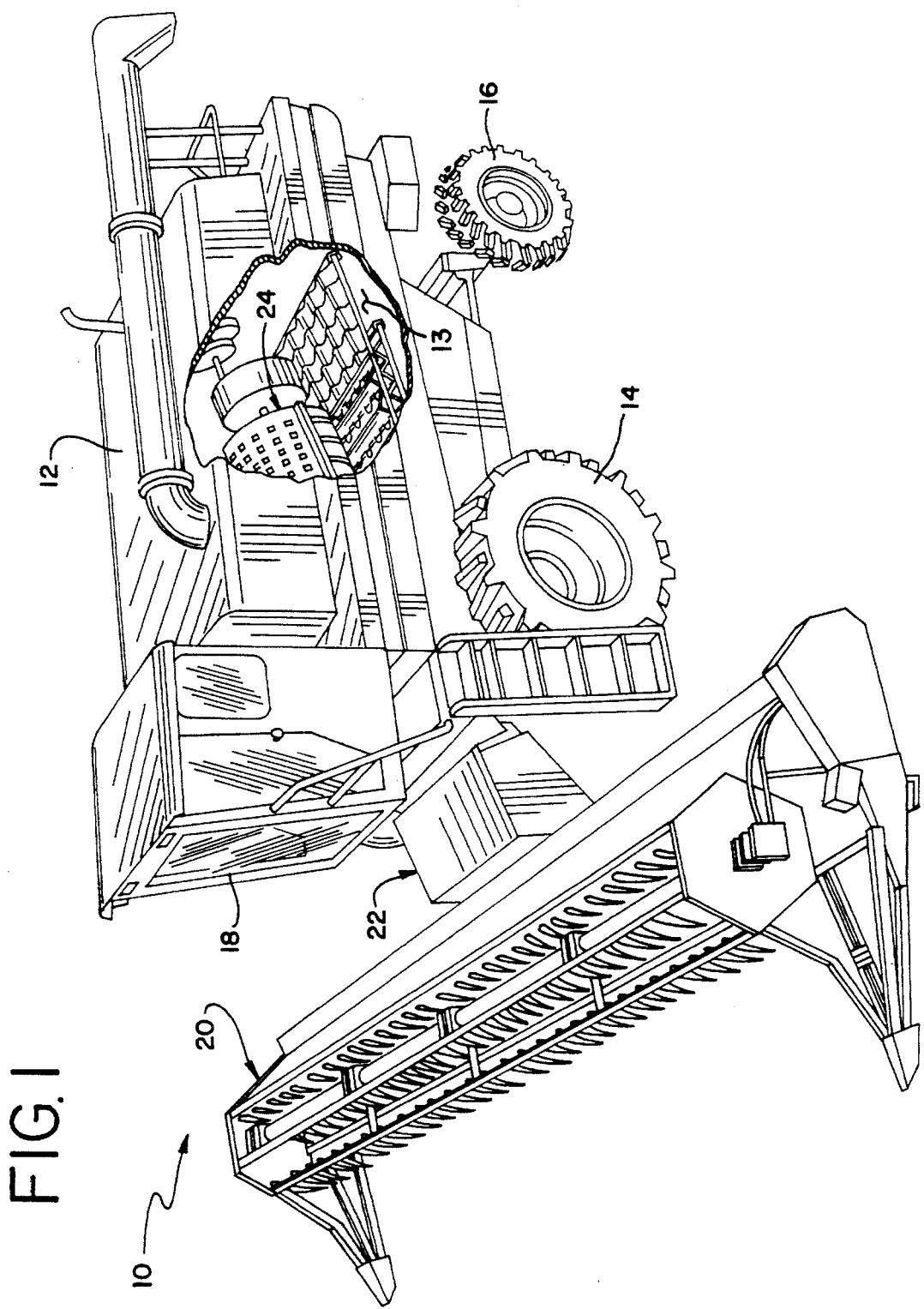
FIG. 1 illustrates a perspective view, partially broken away, of an agricultural rotary combine.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is shown in FIG. 1 a self-propelled rotary combine 10 preferably of the type marketed by the assignee herein and sold under Model Number 1600. The combine 10 includes a longitudinal or fore-and-aft extending frame 11 that includes a body or housing 12 defining an internal open area or space 13 and which is supported on front drive wheels 14 and steerable rear wheels 16. The combine is powered by an engine (not shown) and controlled from an operator's station 18. As is conventional, a crop harvesting apparatus or header 20 and an infeed mechanism 22 are attached at a forward end of the combine. The infeed mechanism 22 feeds crop materials to a rotor assembly 24 enclosed within housing 12.

Figure 2:
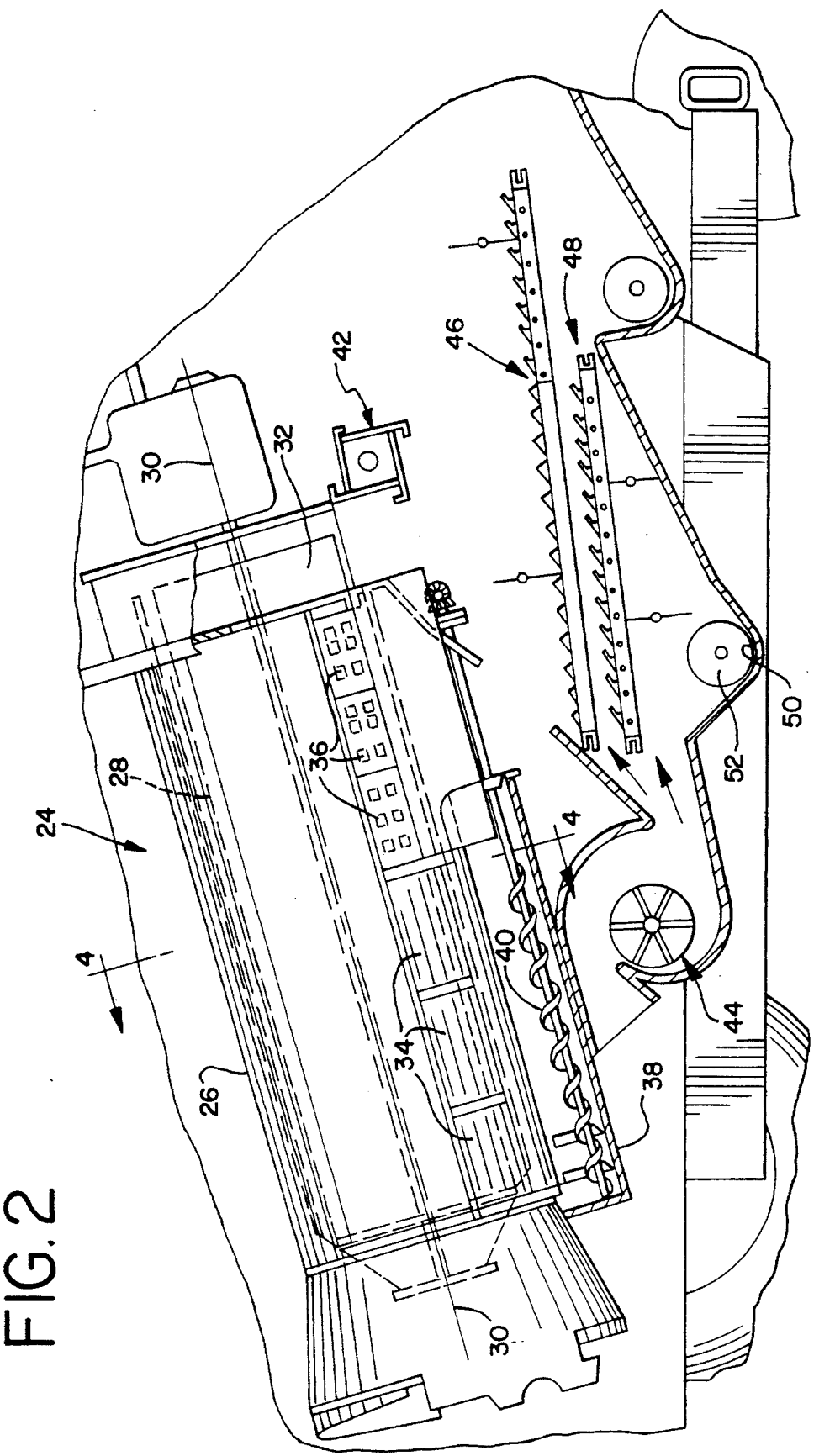
FIG. 2 is an enlarged partial cross-sectional side elevational view of a preferred separating apparatus for a rotary combine.

Turning to FIG. 2, the rotor assembly 24 is preferably configured as a single unit that threshes and separates the crop materials presented thereto into grain and material other than grain. As shown, the rotor assembly 24 is mounted in the internal area 13 defined by housing 12 and comprises an elongated and generally cylindrical member 26 in the form of a rotor casing or cage having a rotor 28 mounted for rotation therein and about a fixed axis 30. Between the upstream and downstream ends of the rotor assembly 24, the crop material is threshed several times repeatedly, but gently, as it spirals around the single large diameter rotor 28 and grain is permitted to pass through the foraminous threshing cage 26. In a conventional manner, suitable instrumentalities mounted on the periphery of the rotor 28 cooperate respectively with semicylindrical concaves 34 and semicylindrical grates 36 provided along the lower portion of the threshing cage 26 to thresh the crop materials such that most of the grain will be separated and propelled downwardly through the concaves 34 and grates 36.

Most of the grain drops onto a grain pan 38. The grain is conveyed rearwardly from the pan 38 by an auger mechanism 40 for subsequent cleaning and collection. Straw, tailings and other waste material is impelled rearwardly out of the discharge end 32 of the rotor assembly 24 where a rotary beater 42 throws the straw and other waste material rearwardly from the combine.

The combine further includes a cleaning system for cleaning chaff, straw, tailings and other foreign material from the grain. As is well known, the cleaning system includes a cleaning fan 44, a chaffer sieve 46, a grain sieve 48 and a clean grain collector 50. A suitable auger mechanism 52 directs clean grain from the collector 50 into a hopper (not shown).

Figure 3:
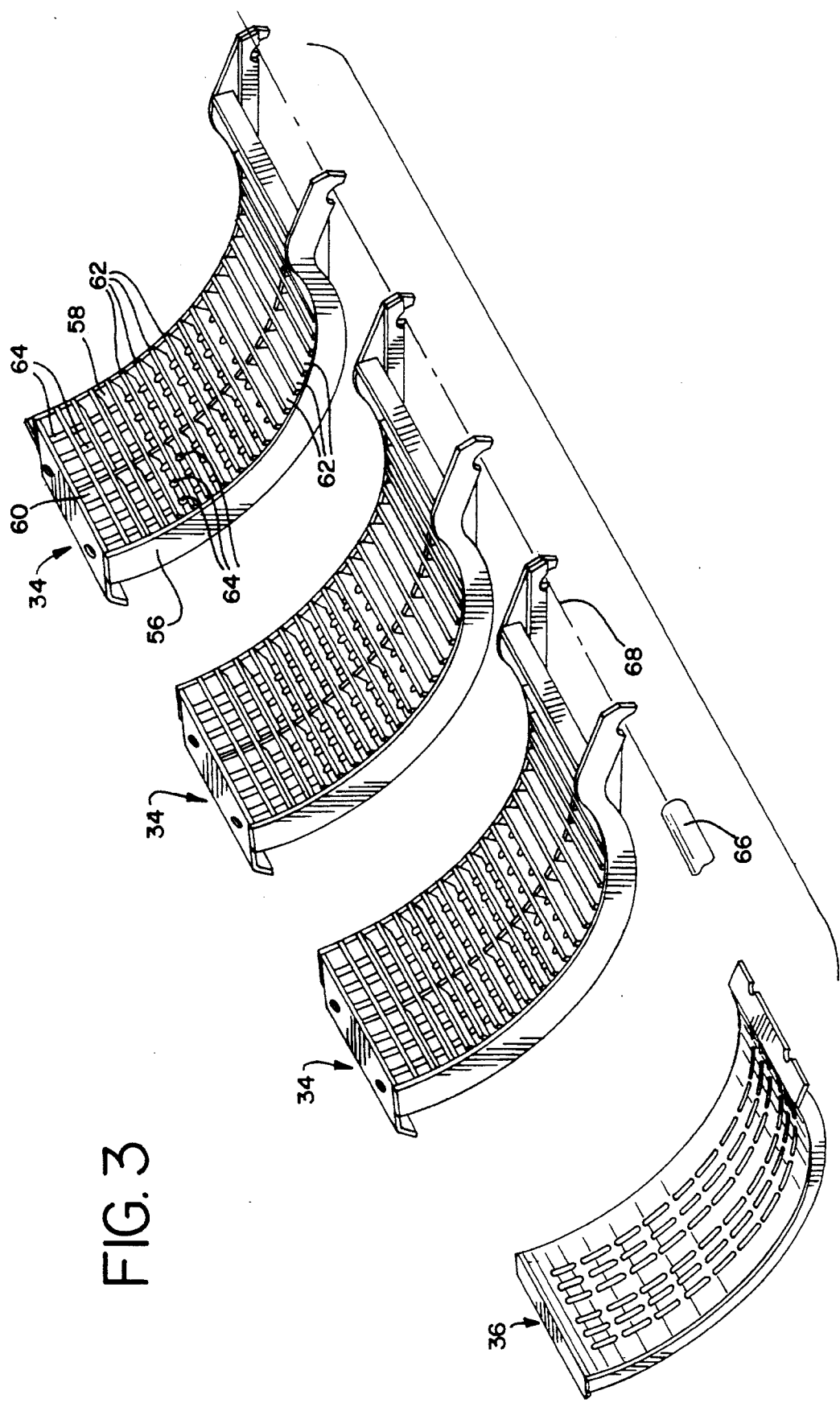
FIG. 3 is a perspective view of semicylindrical concaves and a semicylindrical grate used to form part of an axially elongated threshing section of the combine.

FIG. 3 schematically illustrates the concaves 34 and one grate 36 which cooperate together to define an axially elongated threshing section extending along a lower region of the casing. Although three concaves 34 are illustrated, it should be appreciated that more or less concaves 34 could be provided without detracting or departing from the spirit and scope of the present invention. Suffice it to say that the concaves 34, when arranged in operative association with the casing 26, are mounted in side-by-side relation relative to each other. When in an operative position relative to the rotor 28, the concaves 34 are configured to lie within the cylindrical contour of casing 26, or nearly so.

Since each of the concaves 34 are substantially similar, only one will be described in detail with the understanding that the other concaves are of similar construction. Each concave is of conventional construction and has an arcuate configuration including a generally lattice-like construction. More specifically, each concave 34 includes a pair of end pieces 56 and 58 and at least one medial frame piece 60. A plurality of axially extending frame bars 62 have their opposite ends secured to the end pieces 56 and 58 and traverse and are secured to the medial frame piece 60. A series of rods 64 pass endwise through the frame bars 62 and they complete the perforate concave construction.

Figure 4:
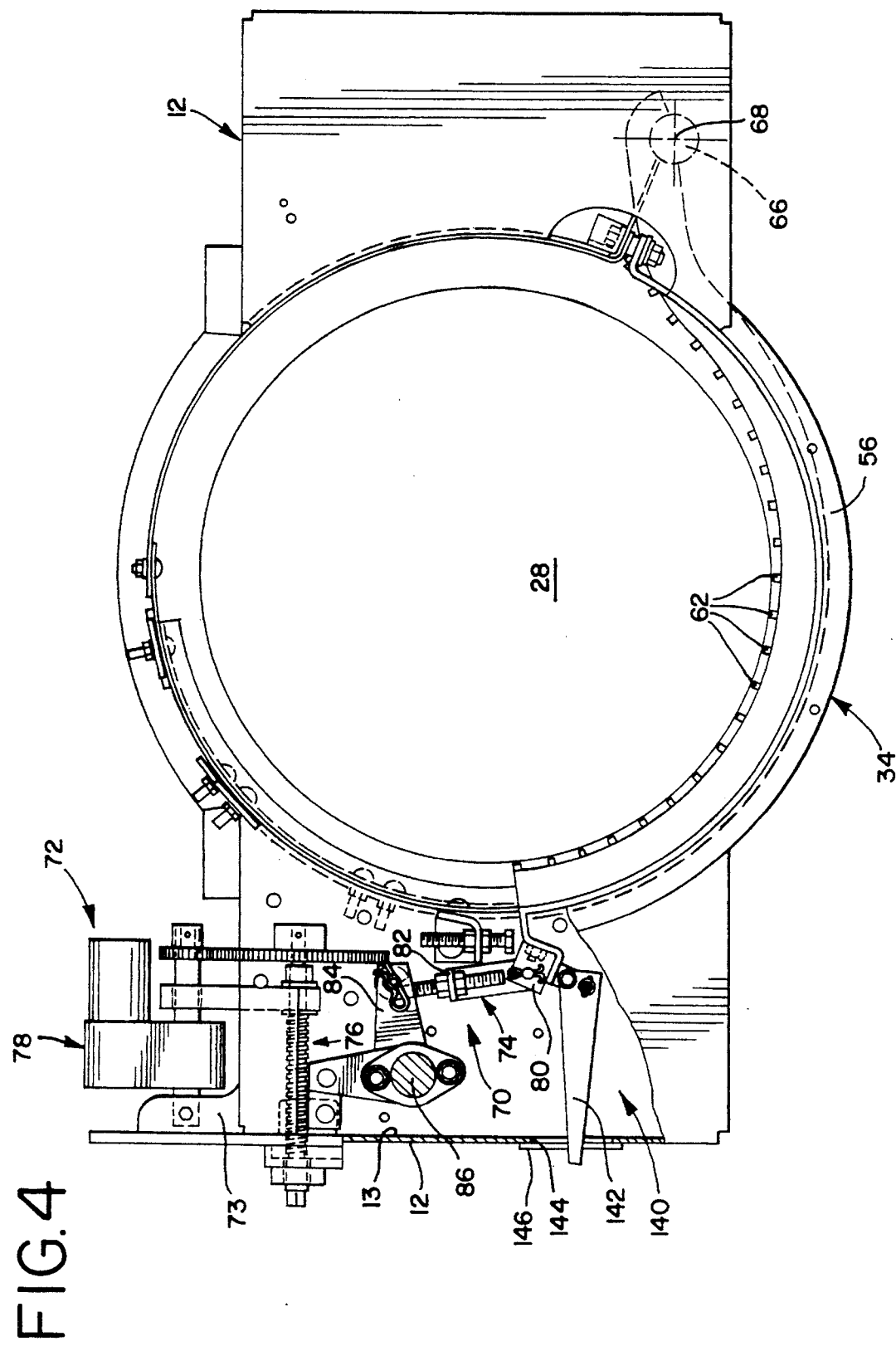
FIG. 4 is a partial cross-sectional view of a threshing area taken along line 4—4 of FIG. 2.

Turning to FIG. 4, each concave 34, when arranged in operative association with the rotor 28, assumes a partial circumferential position about the rotor 28 and is offset toward the left side of the combine as seen in FIG. 4. The concaves 34 are commonly supported at opposite ends of the end pieces 56, 58. The concaves 34 are commonly supported toward one end by an axially elongated carrier 66 that defines an axis 68 extending generally parallel to the rotational axis 30 (FIG. 2) of the rotor assembly 24. The carrier 66 is suitably supported on the body or housing 12 of the combine. As shown in FIGS. 3 and 4, end regions of the end pieces 56 and 58 of each concave are provided with hook-like configurations that fit over the carrier 66 and, thereby, allow each concave 34 to pivot toward and away from the rotor 28 about the axis 68 of the elongated carrier 66. Understandably, any alternative structure that permits movements of the concaves 34 toward and away from the rotor 28 should be considered within the scope of the present invention.

The vertical spacing between the frame bars 62 of each concave 34 and the threshing instrumentalities arranged about the rotor 28 must be adjusted for different crops and different harvesting conditions. For example, smaller grains such as wheat require a smaller spacing between the concaves 34 and rotor 28 than larger grains such as corn. Also, it is beneficial to move the concaves 34 away from the rotor 28 a sufficient distance to allow blockages or crop material jams to be cleared from the annular passage defined between the casing 26 and rotor 28.

Figure 5:
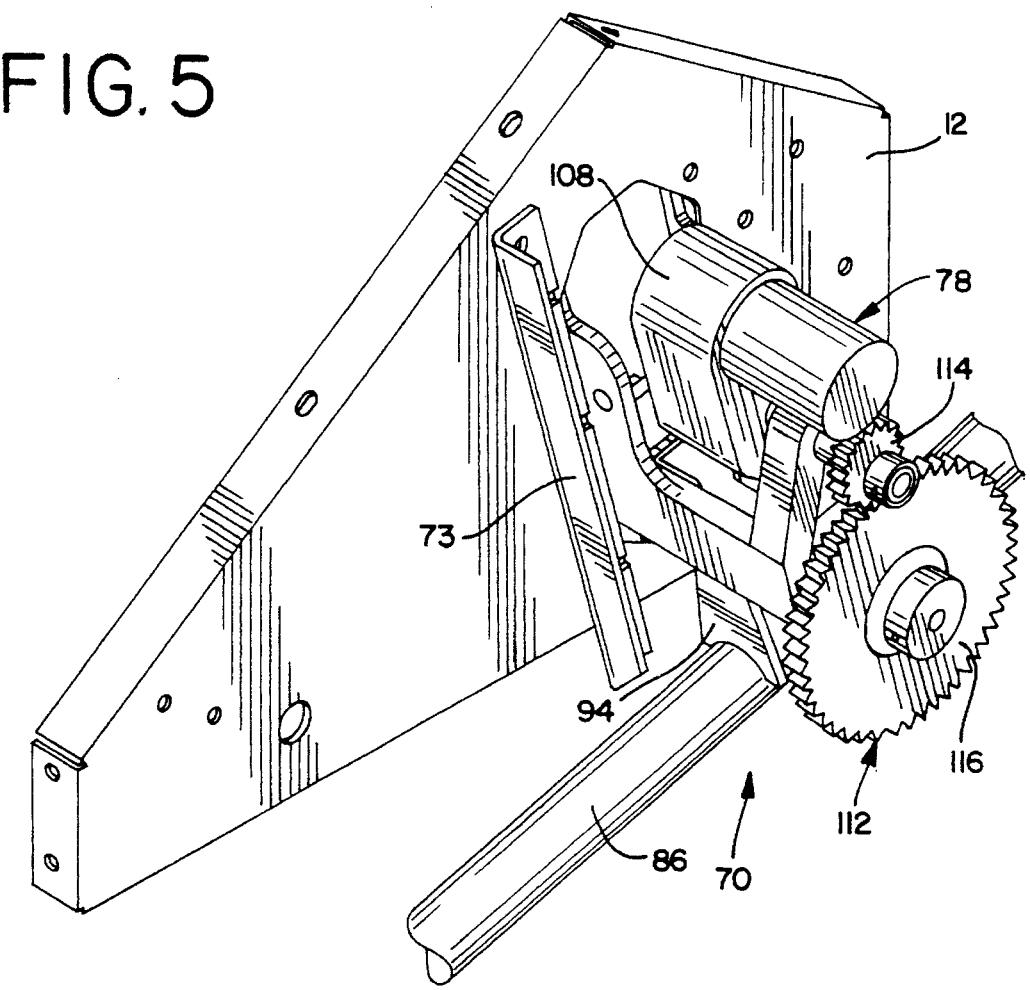
FIG. 5 is a perspective view of a powered motor assembly forming part of a concave adjusting mechanism.

A concave adjustment mechanism, generally designated in FIGS. 4 and 5 by reference numeral 70, is provided for adjusting the spacing between the concaves 34 and the rotor 28. The concave adjusting mechanism 70 is mounted in the internal area 13 defined by housing 12 and includes a powered motor assembly 72 that commonly connects to and supports the other end of the concaves 34 opposite from carrier 66. In a preferred form of the invention, the concave adjustment mechanism 70 is adjustable on-the-go. That is, the powered motor assembly 72 of the adjustment mechanism 70 can be operated to adjust the position of the concaves 34 relative to the rotor 28 as the combine 10 moves over the field. As shown in FIG. 4, the powered motor assembly 72 comprises a housing 73 that mounts the motor assembly 72 internally of the housing 12 of the combine, a linkage assembly 74 that is commonly connected toward one end to each of the concaves 34 and is articulately connected at an opposite end to a screw drive mechanism 76 that is rotatably driven by a motor 78.

Figure 6:
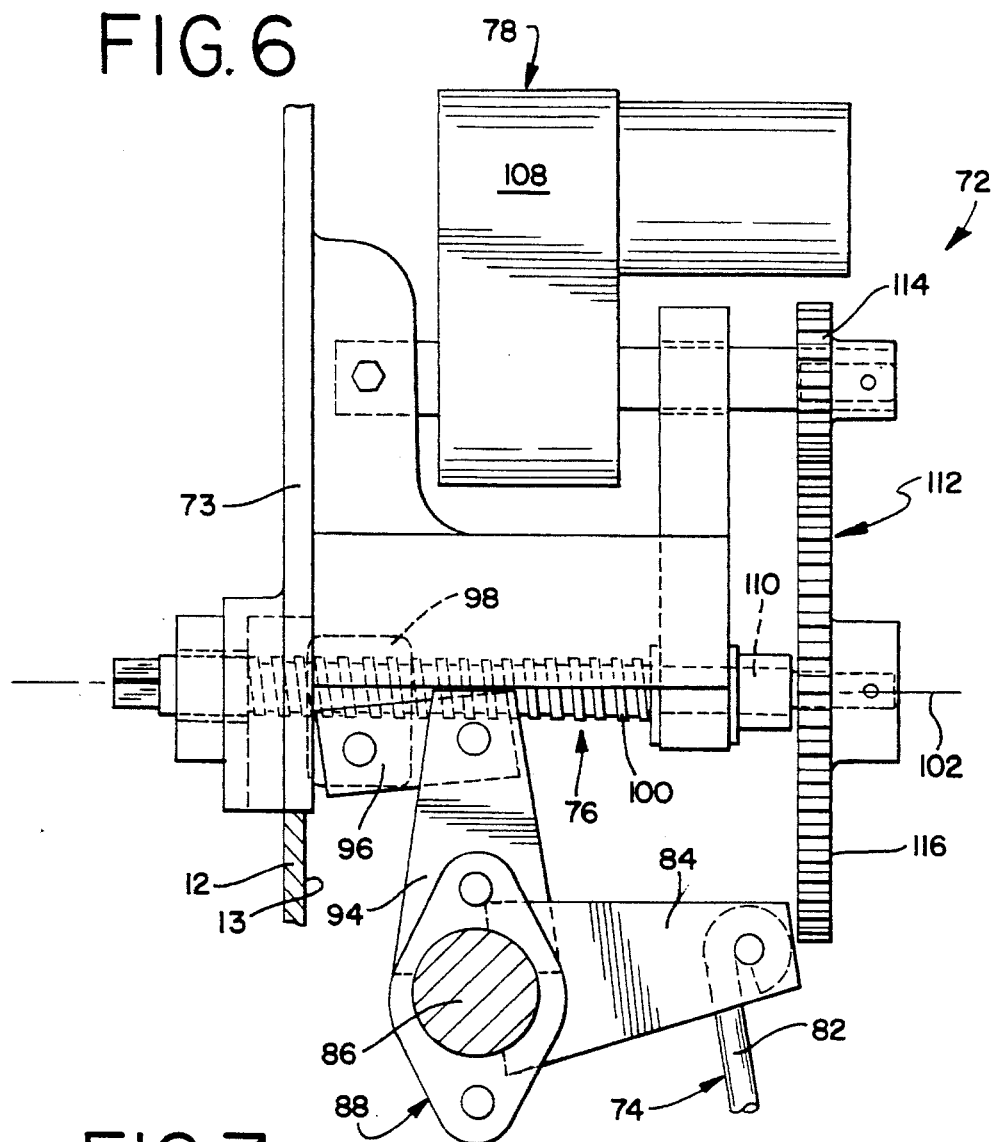
FIG. 6 is an enlarged side elevational view of the powered motor assembly illustrated in FIG. 5.

As shown in FIG. 4, the linkage assembly 74 includes an axially elongated carrier 80 connected toward the ends of the concaves 34 opposite from carrier 66. Linkage 82 extends from the common carrier 80 and articulately connects to outer ends of dual crank arms 84. As illustrated in FIG. 6, the crank arms 84 radially extend from and are secured for movement with an elongated rock shaft 86 that extends generally parallel to shaft 30 (FIG. 2) of the rotor assembly 24. Opposite ends of rock shaft 86 are pivoted in bearing brackets 88 that are secured to the body 12 of the combine.

The linkage assembly 74 further includes a second dual crank arm 94 extending from and secured to the rock shaft 86. An inner end of crank arm 94 is secured to the rock shaft 86 while the outer end is articulately connected to a floating link 96. Link 96 is also articulately connected to a shiftable worm rack or crosshead 98 that forms part of the screw drive mechanism 76.

Figure 7:
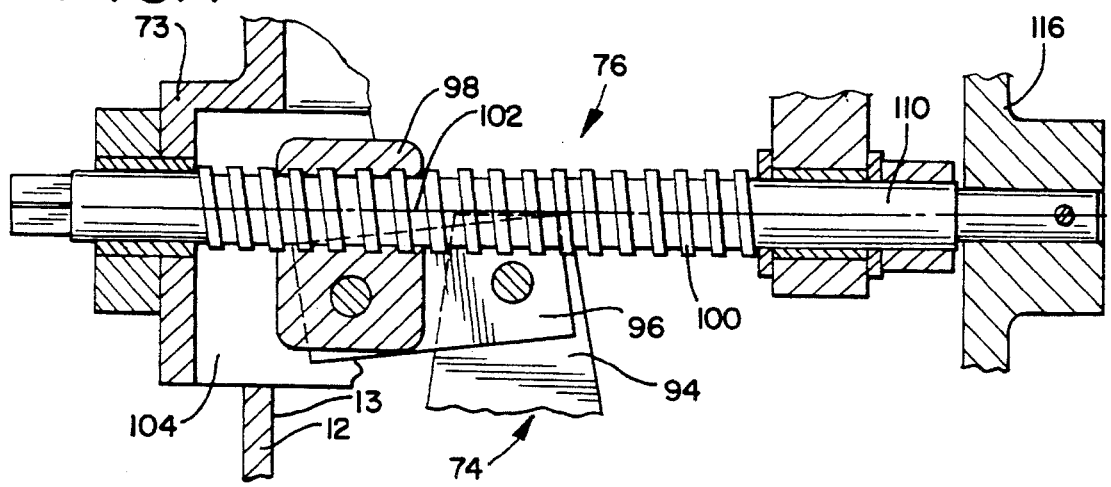
FIG. 7 is a longitudinal sectional view of a lower portion of the powered motor assembly shown in FIG. 6.

As shown in FIGS. 6 and 7, the screw drive mechanism 76 includes an elongated threaded member or worm shaft 100 on which the crosshead 98 is threadably received. Shaft 100 is rotatably mounted about a fixed axis 102 on the housing 73. While being rotatably mounted, the screw or a threaded member 100 is prevented from endwise movement relative to the housing 73. As shown in FIG. 7, housing 73 is provided with a reaction web 104 arranged adjacent to the crosshead 98. The function of the reaction web 104 is to prevent turning movement of the crosshead 98 during rotation of the screw 100 in either direction.

Notably, a free end of the screw 100 extends outwardly past the housing 73 for manual access outside of the combine housing 12. The free end of screw 100 extending beyond the combine housing 12 is configured to removably receive a suitable tool that allows for manual manipulation of the concave adjustment mechanism 70. In the illustrated embodiment, the free end of screw 100 has a generally square configuration but it should be appreciated that other configurations such as hexagonal, screw slots or sockets would likewise suffice.

The motor 78 for the powered assembly 72 is also mounted on the housing 73. The motor 78 can be of any suitable type and is provided to impart powered turning movement to the screw or threaded member 100 of the screw drive mechanism 76. In the illustrated embodiment, a suitable electrically powered motor 108 is provided to impart powered driving movement to the screw 100. As will be subsequently described, the electrically powered motor 108 derives its power from the electrical system normally associated with the combine. In a most preferred form of the invention, the motor 108 is capable of operating in either rotational direction. That is, motor 108 is bidirectional such that it is suited to drive the screw 100 of the screw drive mechanism 76 in either rotational direction.

In a preferred form of the invention, a rotatable output shaft 110 of the motor 108 is connected to the screw 100 of the screw drive mechanism 76 through a suitable force transfer mechanism which, in the illustrated embodiment, is in the form of a gear set 112. In a most preferred form of the invention, gear set 112 preferably includes a drive gear 114 that rotates in response to turning movement of the motor output shaft 110 and a driven gear 116 that is mounted at a free end of the screw 100. As will be appreciated, the ratio of gears 114, 116 and the gear set 112 will determine the speed and torque to be applied to the screw 100 as a function of the speed and torque of the motorized output shaft 110.

Figure 8:
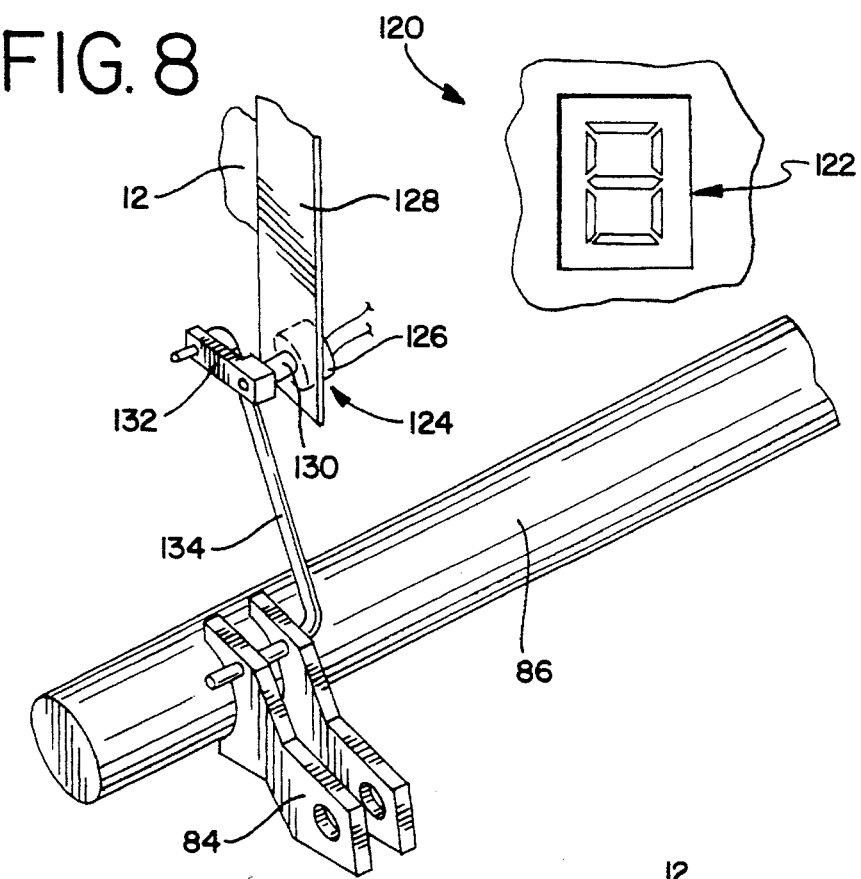
FIG. 8 is a perspective view of one form of indicator assembly associated with the concave adjusting mechanism.

As illustrated in FIG. 8, an indicator assembly 120 including a display 122 provides the operator with a quick and readily available visual indication representative of the setting of the concaves 34 relative to the rotor 28. The display 122 is arranged at the operator station 18 (FIG. 1 ) of the combine and preferably includes an LCD digital display of the type capable of portraying different forms of alphanumeric indicia thereon. The indicia visible on the display 122 represents a particular setting of the concaves 34 relative to the rotor 28.

In the illustrated embodiment in FIG. 8, the display 122 operates in response to a sensor 124 that monitors the position of the concaves 34 relative to the rotor 28. Preferably, sensor 124 includes a conventional potentiometer 126 that is carded on a mounting plate 128 connected to a portion of the housing 12 of the combine. As is well known, the potentiometer 126 includes a rotatable rod 130 that has an arm 132 connected thereto and extending radially therefrom. A distal end of arm 132 is connected to one end of a linkage 134. The other end of the linkage 134 is connected to one of the dual crank arms 84 extending from rock shaft 86. As will be appreciated, turning movements of the rock shaft 86 which result in positioning movements of the concave 34 relative to the rotor 28 and will likewise cause proportional movements of the arm 132 which are transferred to the shaft 130 of the potentiometer 126. As will be appreciated, the angular disposition of the shaft 130 of the potentiometer 126 is reflective of the position of the concaves 34 relative to the rotor 28. The output of the potentiometer 126 is visually reflected as a readout on the monitor or display 122 thereby providing the operator with an indication of the position of the concaves 34 relative to the rotor 28.

Figure 9:
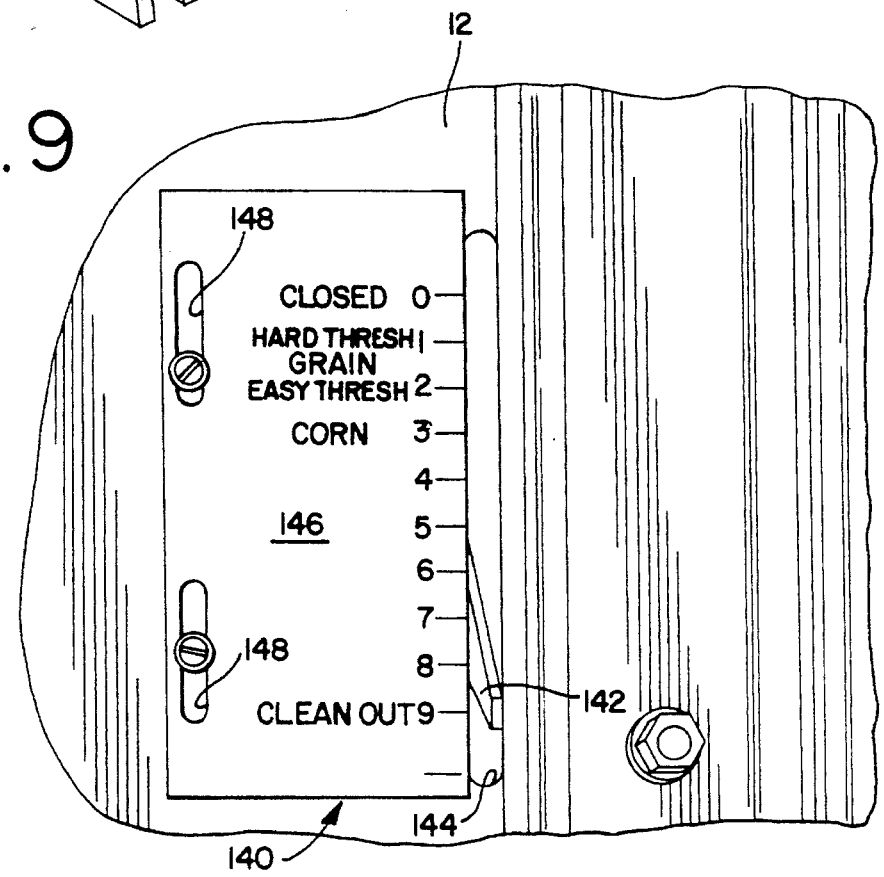
FIG. 9 is a side elevational view of another form of indicator assembly associated with the concave adjusting mechanism.

An additional indicator 140 is provided on the side of the combine housing 12 for visually indicating the position of the concaves 34 relative to the rotor 28. As shown in FIG. 4, indicator 140 includes a rigid arm 142 that is connected to and extends in a cantilevered fashion from the concaves 34. The free end of arm 142 extends through a vertical slot 144 provided in a side wall of the combine housing 12 and moves with the concaves 34. As shown in FIG. 9, a gauge 146 is arranged adjacent to the slot 144 and is provided with suitable indicia thereon. As will be appreciated, vertical alignment between the free end of arm 142 and the indicia provides a visual indication of the position of the concaves 34 relative to the rotor 28. As shown, gauge 146 is provided with vertically elongated slots 148 for calibrating the gauge 146 to the positions of the concaves 34 relative to the rotor.

Figure 10:
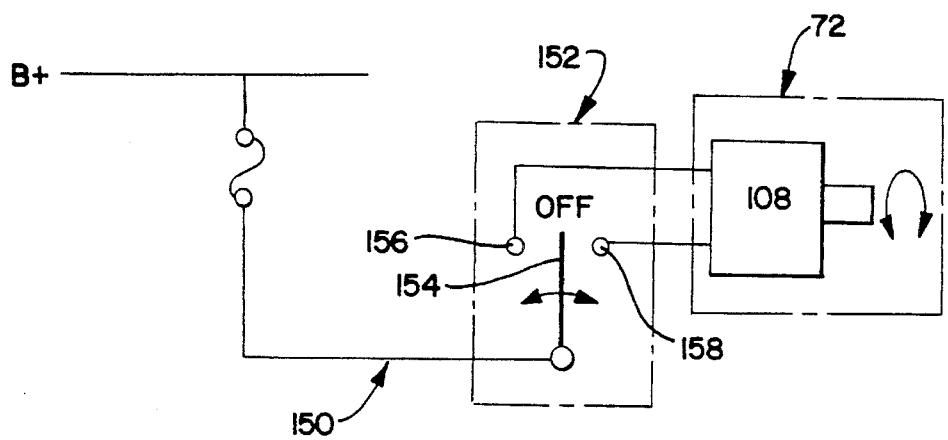
FIG. 10 is a schematic diagram of one form of electrical circuitry associated with the concave adjusting mechanism.

A simplified diagram of electrical circuitry 150 for operating the powered motor assembly 72 is schematically illustrated in FIG. 10. A three-position switch assembly 152 is preferably arranged in the operator station 18 (FIG. 1) of the implement. As shown, a manually movable contact 154 of switch 152 is connected to a power source B+ such as the battery (not shown) on the combine. Contact 154 of switch assembly 152 is normally arranged in an OFF position. Contact 154, however, is manually movable into engagement with either of two terminals 156 or 158. Terminals 156, 158 are each connected to the bidirectional motor 108 of the powered motor assembly 72. When the operator desires to raise the concaves 34 toward the rotor, the operator moves contact 154 into engagement with terminal 156 thereby operating the motor 108 in a direction whereby the concave adjustment mechanism 70 moves all of the concaves 34 in unison toward the rotor 28. Alternatively, when the operator desires to increase the circumferential spacing between the concaves 34 and the rotor 28, the operator moves the contact 154 of switch 152 into engagement with terminal 138 thereby operating the motor 108 and, thus, the powered motor assembly 72 such that the concave adjustment mechanism 70 operationally moves all of the concaves away from the rotor.

When the concaves 34 are in their operative position relative to the rotor 28 (as shown in FIG. 4), the frame bars 62 of each concave 34 are arranged proximate to the path of the threshing instrumentalities on the rotor 28 to impart a separating and threshing action to the crop materials passing through the rotor assembly 24. In the most preferred form of the invention, a medial region or section of each concave 34 is arranged closer to the rotor 28 than are opposite ends of each concave.

When the concave 34 is in an operative relation relative to the rotor 28, the crosshead 96 of the screw drive mechanism 76 is arranged proximate to one end of the threaded member 100 of the screw drive mechanism 76. If it is desired to adjust the position of the concaves 34 through a small angle thereby altering the threshing characteristics of the rotor assembly 24, small increments of travel of the crosshead 98 on the threaded member or screw 100 can be effected by operating the motor 108 under the influence of the switch assembly 152 for a short period of time. Of course, the longer the switch assembly 152 is positioned to drive the motor 108, the more movement of the concaves 34 relative to the rotor 28 will result.

When the motor 108 of the powered motor assembly 72 is operated, the turning movement of the output shaft 110 of the motor 108 is transferred to the threaded member or screw 100 of the screw drive mechanism 76 through the force transfer mechanism 112. Turning movements of the threaded member 100 causes the non-rotational crosshead 98 to move linearly along the threaded member 100 depending upon the direction of rotation of the threaded member 100. Linear movement of the crosshead 98 is transferred to the rockshaft 86 through the dual crank arms 84 and 94 which constitute, in effect, bell crank levers. Movement of the bell crank levers of the powered motor assembly results in movement of the linkage 74 which is thus translated into movements of the concave 34 relative to the rotor 28 thereby effecting the threshing characteristics of the rotor assembly 24. Of course, if the motor 108 should fail, for whatever reason, a tool can be applied to the free end of the screw 100 to allow manual adjustment of the position of the concaves 34 relative to the rotor 28.

In the preferred form of the invention, the indicator assemblies 120 and 140 each provide visual indications of the position of the concaves 34 relative to the rotor 28. Indicator assembly 120 provides a visual indication on the display 122 in the cab region 18 of the combine and is operated in response to the concave sensor 124. By this arrangement, the operator may desire to adjust the position of the concaves 34 on-the-go, i.e., as the combine is driven across the field. Indicator assembly 140 is a mechanical-type device which moves with the concaves 34 and is preferably located on the side of the combine housing 12 to provide an additional indication of the adjusted position of the concaves 34 relative to the rotor 28.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A rotary combine having a frame, a body carried on said frame and defining an internal area, an elongated rotor assembly mounted on the frame in the internal area of the body for threshing crop materials presented thereto, said rotor assembly comprising a rotor arranged for rotation about a fixed axis and within a rotor casing, said rotor casing is supported on the frame within said internal area of the body and includes a perforated threshing section defined by two adjacent concave members extending in circumferential relation relative to said rotor, and wherein the concave members are each supported by a common elongated carrier that extends generally parallel to the rotor, and a concave adjustment assembly is arranged within said internal area for simultaneously adjusting the relative spacing between the rotor and the concave members, said concave adjustment assembly comprising a powered motor assembly arranged within said internal area, linkage arranged within said internal area and that pivots about an axis extending generally parallel to the fixed axis of rotation of the rotor, said linkage being operably connected to and simultaneously moves said concave members toward and away from the rotor to variably control the cooperative threshing relationship between the rotor and the concave members, a screw drive mechanism driven by a gear arrangement and disposed between said motor assembly and said linkage, said screw drive mechanism including a screw rotatable about its longitudinal axis and is prevented from axial movement therealong, and wherein the screw of the screw drive mechanism is arranged in the internal area defined by the body of the combine.

2. The rotary combine according to claim 1 wherein a medial region of said concave member is arranged closer to the rotor than are opposite ends of said concave member.

3. The rotary combine according to claim 1 wherein said screw drive mechanism includes a crosshead threadably mounted on said screw, said crosshead being connected to said linkage and linearly moves in response to actuation of said powered motor assembly.

4. The rotary combine according to claim 3 wherein one end of said screw of the screw drive mechanism extends externally of said internal area of the body and is configured to allow a tool to be secured thereto for effecting manual adjustment of the concave member relative to said rotor.

5. The rotary combine according to claim 1 further including an indicator connected to and movable with said concave member for visually indicating the position of the concave member relative to the rotor.

6. A rotary combine having a mobile frame, a housing including an operator station arranged at a forward end of the frame, an elongated rotor assembly mounted within an internal area defined by said housing, said rotor assembly comprising a rotor arranged within a stationary rotor casing to cooperate together in threshing crop materials presented to the rotor assembly, said rotor casing including an axially elongated threshing section defined by a plurality of perforated concaves arranged in adjacent relationship relative to each other, each concave defining an arcuate section in the lower region of the casing, with each concave being supported toward one end for pivotal movement about a common axis extending generally parallel to an elongated rotational axis of the rotor, and a concave adjustment assembly is arranged within said internal area of the combine housing and is operably connected to each of the concaves such that the concaves can be simultaneously raised and lowered about said common axis on-the-go relative to the rotor of the rotor assembly.

7. The rotary combine according to claim 6 further including an axially elongated carrier about which at least a portion of each concave rotatably fits and that defines the pivot axis for each concave.

8. The rotary combine according to claim 6 wherein said concave adjustment assembly includes a powered motor assembly including a bidirectional motor for rotating a threaded member about a fixed axis, with said threaded member being mounted to prevent its movement along said axis, and a linkage assembly that is operably connected to each of said concaves and that is operated in response to rotation of said threaded member for adjusting the relative relationship between the rotor and the concaves.

9. The rotary combine according to claim 8 wherein said powered motor assembly further includes a gear set arranged between an output of said motor and the threaded member.

10. The rotary combine according to claim 8 further including a switch mounted on the frame for selectively operating said motor assembly to move the concaves either toward or away from the rotor.

11. The rotary combine according to claim 6 further including a sensor for monitoring the relationship between said concaves and the rotor assembly, and an indicator connected and responsive to said sensor and arranged in the operator station for visually indicating the position of the concaves relative to the rotor as monitored by said sensor.

12. A rotary combine having a frame, a housing mounted on said frame, an elongated rotor assembly mounted on the frame and within an internal area defined by said housing for threshing crop material presented thereto, said rotor assembly comprising a rotor arranged within a rotor casing for rotation about a fixed axis, said rotor casing being mounted to the frame and includes a perforated threshing section extending axially along an underside portion of the casing, said threshing section including at least two concave members arranged in side-by-side relation relative to each other, an axially elongated mounting member defining an elongated axis extending generally parallel to said fixed axis and that commonly mounts the concave members for movement toward and away from the rotor, and a concave adjustment mechanism arranged within the internal area of the housing and including a powered motor assembly operably connected between the frame and the concave members for vertically moving the concave members in unison toward and away from the rotor on-the-go and about said elongated axis to vary the threshing relationship between the rotor and the concaves.

13. The rotary combine according to claim 12 wherein a medial region of each concave member is arranged closer to said rotor than are opposite ends of each concave member.

14. The rotary combine according to claim 12 wherein each concave member includes structure toward one end thereof for pivotally mounting the respective concave member to said elongated mounting member.

15. The rotary combine according to claim 14 further including a linkage assembly commonly connected to an opposite end of the concave members and to said powered motor assembly of the concave adjustment assembly, and wherein said powered motor assembly comprises a bidirectional motor connected to said linkage assembly for moving said concave members toward and away from the rotor.

16. The rotary combine according to claim 15 wherein said concave adjustment assembly further includes a screw drive mechanism operably interposed between said motor and said linkage assembly.

17. A self-propelled rotary combine having a wheeled frame, a housing including a cab region arranged at a forward end of the frame and a housing carried by said frame rearwardly of said cab region, an elongated rotor assembly mounted within an internal area defined by said housing, said rotor assembly comprising a rotor arranged within a stationary rotor casing to cooperate together in threshing crop materials presented to the rotor assembly, said rotor casing including an axially elongated threshing section defined by a plurality of perforated concaves, each concave defining an arcuate section in the lower region of the casing and that is arranged in at least partial circumferential relation relative to said rotor, with each concave being supported toward one end for pivotal movement about a common axis extending generally parallel to an elongated rotational axis of the rotor, and a concave adjustment assembly is operably connected between the frame and each concave, said concave adjustment assembly including a powered motor assembly connected to a selectively operated switch mounted within the cab region of the combine for allowing the operator to simultaneously adjust on-the-go the circumferential spacing between the concaves and the rotor thereby varying the threshing relationship between the rotor and the concaves as the combine is driven across a field.

18. The rotary combine according to claim 17 wherein said concave adjustment assembly comprises a linkage assembly commonly connected toward a second end of each concave, and wherein said powered motor assembly includes a motor operably connected to the linkage assembly for adjusting of the concaves relative to the rotor.

19. The rotary combine according to claim 18 wherein said concave adjustment assembly further includes a screw drive mechanism operably interposed between said motor of the powered motor assembly and the linkage assembly.

20. The rotary combine according to claim 18 further including a sensor for monitoring the relationship of the concaves relative to the rotor of the rotor assembly, and an indicator responsive to said sensor for providing a visual indication of the position of the concave relative to the rotor.

21. A concave adjustment mechanism for a rotary combine including a mobile frame, a housing mounted on the frame and defining an internal area, an elongated rotor assembly mounted on the frame within the internal area defined by the housing of the combine, said rotor assembly including a rotor arranged within a rotor casing for threshing crop materials directed through the rotor assembly, said rotor casing including an axially elongated threshing section defined by a plurality of side-by-side concaves, each concave defining an arcuate section in the lower region of the casing, and wherein each concave is supported for movement toward and away from the rotor about a common axis, said concave adjustment mechanism comprising:

an electrically powered motor assembly mountable within the internal area of the combine housing, said powered motor assembly being connected to and simultaneously adjusts the concaves toward and away from the rotor, a linkage assembly that connects each of the concaves to the powered motor assembly, and wherein said powered motor assembly includes a bidirectional motor operably connected to the linkage assembly for moving the concaves on-the-go toward and away from the rotor.

22. The concave adjustment mechanism according to claim 21 further including a screw drive mechanism arranged within the internal area defined by said combine housing and operably interposed between said motor and said linkage.

* * * * *